(12) United States Patent
McKean et al.

(10) Patent No.: US 8,201,001 B2
(45) Date of Patent: Jun. 12, 2012

(54) METHOD FOR OPTIMIZING PERFORMANCE AND POWER USAGE IN AN ARCHIVAL STORAGE SYSTEM BY UTILIZING MASSIVE ARRAY OF INDEPENDENT DISKS (MAID) TECHNIQUES AND CONTROLLED REPLICATION UNDER SCALABLE HASHING (CRUSH)

(75) Inventors: Brian McKean, Longmont, CO (US);
Kevin Kidney, Lafayette, CO (US);
Ross Zwisler, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 442 days.

(21) Appl. No.: 12/462,425

(22) Filed: Aug. 4, 2009

(65) Prior Publication Data

US 2011/0035605 A1 Feb. 10, 2011

(51) Int. Cl.
*G06F 1/32* (2006.01)
(52) U.S. Cl. .................. 713/320; 713/300; 713/310
(58) Field of Classification Search .................. 713/300, 713/310, 320
See application file for complete search history.

(56) References Cited

U.S. PATENT DOCUMENTS

| | | | | |
|---|---|---|---|---|
| 5,423,046 A * | 6/1995 | Nunnelley et al. | ............ | 713/330 |
| 5,796,633 A | 8/1998 | Burgess et al. | | |
| 6,269,433 B1 * | 7/2001 | Jones et al. | .................. | 711/168 |
| 6,314,503 B1 | 11/2001 | D'Errico et al. | | |
| 6,895,485 B1 | 5/2005 | DeKoning et al. | | |
| 7,360,017 B2 * | 4/2008 | Higaki et al. | .................. | 711/114 |
| 7,516,348 B1 * | 4/2009 | Ofer | .............................. | 713/324 |
| 8,060,759 B1 * | 11/2011 | Arnan et al. | .................. | 713/300 |
| 2003/0149837 A1 | 8/2003 | Coker et al. | | |
| 2004/0187131 A1 | 9/2004 | Dageville et al. | | |
| 2005/0268119 A9 * | 12/2005 | Guha et al. | ..................... | 713/300 |
| 2006/0069886 A1 | 3/2006 | Tulyani | | |
| 2007/0162692 A1 * | 7/2007 | Nishimoto et al. | ........... | 711/113 |
| 2008/0259710 A1 * | 10/2008 | Wenzel et al. | ................ | 365/226 |
| 2009/0083483 A1 * | 3/2009 | Balakrishnan et al. | ........ | 711/114 |
| 2009/0217067 A1 * | 8/2009 | Radhakrishnan et al. | .... | 713/320 |
| 2010/0058090 A1 * | 3/2010 | Taki et al. | ..................... | 713/324 |
| 2010/0082729 A1 * | 4/2010 | Shitomi | ........................ | 709/202 |
| 2010/0100677 A1 * | 4/2010 | McKean et al. | ............... | 711/114 |
| 2010/0115310 A1 * | 5/2010 | Kubota et al. | ................. | 713/320 |
| 2010/0313045 A1 * | 12/2010 | Olarig et al. | .................. | 713/320 |
| 2011/0016336 A1 * | 1/2011 | Mori et al. | .................... | 713/320 |

(Continued)

OTHER PUBLICATIONS

U.S. Appl. No. 12/288,037, filed Oct. 16, 2008, McKean, et al.

(Continued)

*Primary Examiner* — Kim Huynh
*Assistant Examiner* — Zahid Choudhury
(74) *Attorney, Agent, or Firm* — Suiter Swantz pc llo

(57) ABSTRACT

The present invention is a method for drive management and data placement in an archival storage system having a set of drives. The method includes mapping redundant data stripes onto the drives. A first active data stripe, located on a first subset of the drives, is then selected from the mapped data stripes. The first subset is placed into a normal power state and a second subset of the drives is placed into a low power state. Data is then written to the first active data stripe. Before the first active data stripe is fully used, the method includes selecting a next active/second active data stripe from the mapped data stripes, the second active data stripe being at least partially located on the second subset. The method may be performed by a system which implements MAID techniques for drive management and CRUSH for data placement.

10 Claims, 3 Drawing Sheets

U.S. PATENT DOCUMENTS

2011/0029729 A1* 2/2011 Zwisler et al. ............... 711/114
2011/0035547 A1* 2/2011 Kidney et al. ................ 711/114
2011/0119509 A1* 5/2011 Yanagawa et al. ........... 713/320

OTHER PUBLICATIONS

U.S. Appl. No. 12/462,427, filed Aug. 4, 2009, Kevin Kidney, et al.

Weil, et al., CRUSH: Controlled, Scalable, Decentralized Placement of Replicated Data, Nov. 2006, Published in: US.
Kai Hwang, et al., Raid-x: A New Distributed Disk Array for I/O-Centric Cluster Computing, 2000, pp. 279-286, Publisher: IEEE Xplore, Published in: US.
Colarelli, et al., The Case for Massive Arrays of Idle Disks (MAID), Jan. 7, 2002, Published in: US.

* cited by examiner

METHOD FOR OPTIMIZING PERFORMANCE AND POWER USAGE IN AN ARCHIVAL STORAGE SYSTEM BY UTILIZING MASSIVE ARRAY OF INDEPENDENT DISKS (MAID) TECHNIQUES AND CONTROLLED REPLICATION UNDER SCALABLE HASHING (CRUSH)

CROSS-REFERENCE TO RELATED APPLICATIONS

The following patent application is incorporated by reference in its entirety:

| Attorney Docket No. | Express Mail No. | Filing Date | Ser. No. |
| --- | --- | --- | --- |
| LSI 09-0124 | EM 316812552 | Aug. 04, 2009 | 12/462,427 |

FIELD OF THE INVENTION

The present invention relates to the field of data management in disk-based archival storage systems and particularly to a method for optimizing performance and power usage in an archival storage system by utilizing Massive Array of Independent Disks (MAID) techniques for drive management and Controlled Replication Under Scalable Hashing (CRUSH) for data placement.

BACKGROUND OF THE INVENTION

Currently available methods for providing data management in disk-based archival storage systems may not provide a desired level of performance.

Therefore, it may be desirable to provide a method(s) for providing data management in disk-based archival storage systems which addresses the above-referenced shortcomings of currently available solutions.

SUMMARY OF THE INVENTION

Accordingly, an embodiment of the present invention is directed to a method for drive management and data placement in an archival storage system which includes a set of drives, said method including: mapping a plurality of redundant data stripes onto the set of drives; selecting a first active data stripe from the plurality of redundant data stripes, the first active data stripe being located on a first subset of the set of drives; placing the first subset into a first power state; placing a second subset of the set of drives into a second power state, the second power state being a lower power state than the first power state; and writing a first set of data to the first active data stripe.

A further embodiment of the present invention is directed to a computer-readable medium having computer-executable instructions for performing a method of drive management and data placement in an archival storage system which includes a set of drives, said method including: mapping a plurality of redundant data stripes onto the set of drives; selecting a first active data stripe from the plurality of redundant data stripes, the first active data stripe being located on a first subset of the set of drives; placing the first subset into a first power state; placing a second subset of the set of drives into a second power state, the second power state being a lower power state than the first power state; writing a first set of data to the first active data stripe; and when the first active data stripe contains an amount of data that is smaller than a maximum data capacity value of the first active data stripe, selecting a second active data stripe from the plurality of redundant data stripes, the second active data stripe being located on a third subset of the set of drives, the third subset including at least one drive of the second subset.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
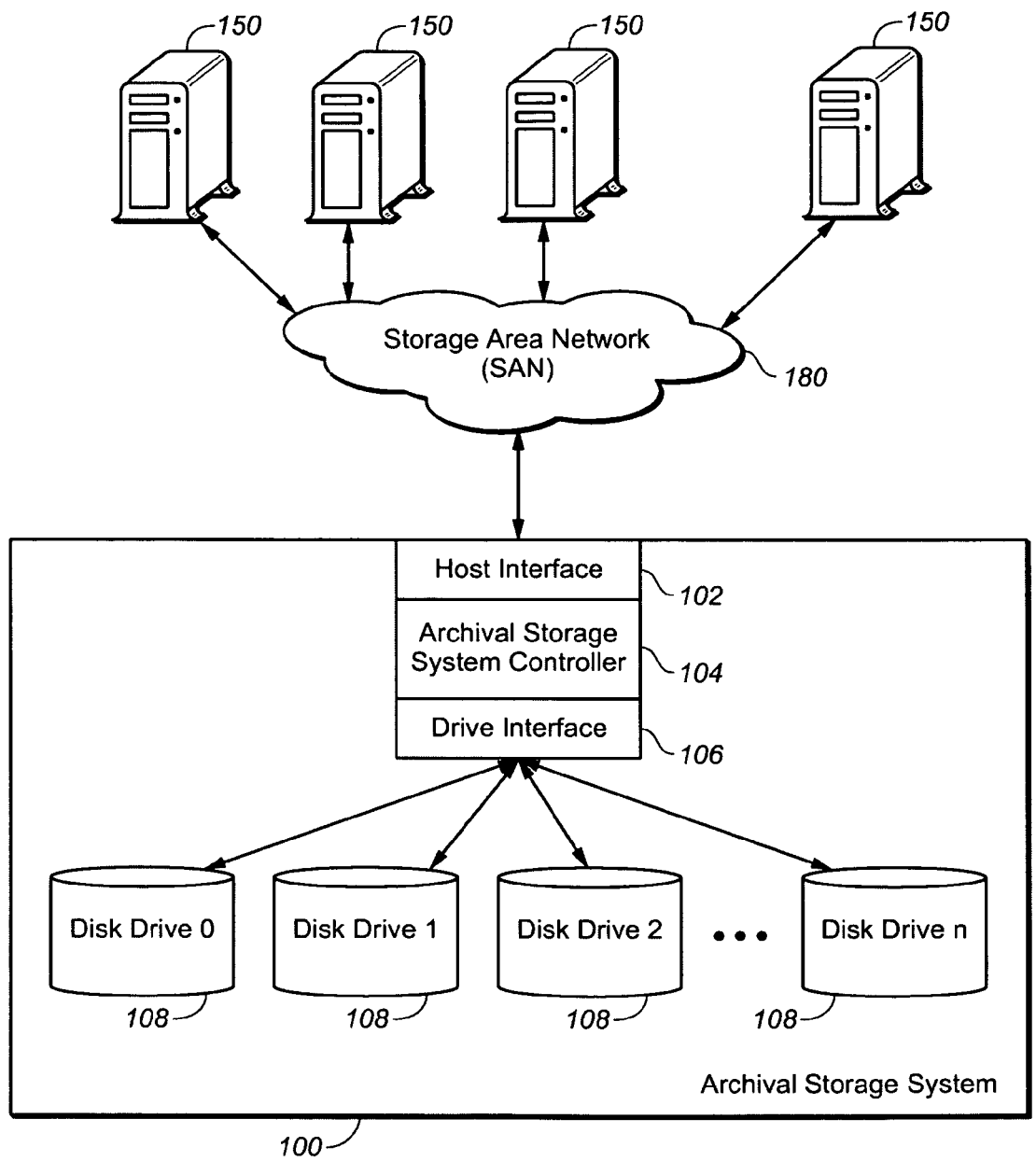
FIG. 1 is a block diagram schematic of a disk-based archival storage system in accordance with an exemplary embodiment of the present invention, the disk-based archival storage system being connected to a plurality of servers.

Referring to FIG. 1, a block diagram of an archival storage system 100 via which a method for performing data management in accordance with an exemplary embodiment of the present invention may be implemented is shown. The archival storage system 100 may be a disk-based archival storage system 100. Further, the archival storage system 100 may be connected to one or more servers 150 via a Storage Area Network (SAN) 180. In the illustrated embodiment, the archival storage system 100 may include a host interface 102 for allowing the archival storage system 100 to be connected to the servers 150 via the SAN 180. The archival storage system 100 may further include an archival storage system controller 104 which may be connected to the SAN 180 (and the servers 150) via the host interface 102. The archival storage system 100 may further include a plurality of disk drives 108 which may be connected to the archival storage system controller 104 via a drive interface 106.

The archival storage system 100 of the present invention may be configured for storing data which is typically written once, never overwritten and infrequently/rarely accessed. Further, after some retention period, the data may be discarded.

Archival storage systems must generally always be ready to accept new data to be written. However, in a number of archival storage systems, there may be a delay when reading data from these systems. For example, in a tape library archival system, a mounted tape (ex.—a tape mounted on a tape drive) may be available to store newly written data. Once the tape fills with data written to said tape, the library/tape library archival system may remove the tape from the drive, may store the tape, and may replace the stored tape with a next tape to be written. If the data written to the stored tape is required at a later time, the tape library archival system generally must mount (ex.—re-mount) the stored tape on the tape drive, prior to retrieving the data.

Massive Array of Independent Disks (MAID) systems are generally configured so that a small number of drives are active (ex.—in a normal power state) and able to immediately receive data that needs to be archived. If the archived data later needs to be read, it may likely be stored on drives that are in a low power state/lower power state and are not immediately accessible. A user of such a MAID system must then wait until the drives upon which the archived data is stored are placed in/returned to a normal power state/normal operating state before the archived data is accessible.

Controlled Replication Under Scalable Hashing (CRUSH) (ex.—Archival Green CRUSH) is a mechanism for mapping data to storage objects which was developed by the University of California at Santa Cruz. For example, CRUSH techniques are disclosed in: *CRUSH: Controlled, Scalable, Decentralized Placement of Replicated Data.*, Weil et al., Proceedings of SC '06, November 2006, which is herein incorporated by reference in its entirety. CRUSH allows redundancy methods to operate independently of data placement algorithms. For example, a CRUSH system may have as its redundancy mechanism a Redundant Array of Inexpensive Disks (RAID) mechanism/a RAID stripe, such as a RAID 5 4+1 stripe. Each stripe of information on this redundancy group/redundancy mechanism may be mapped by CRUSH to a set/subset of 5 drives within a set of drives of the CRUSH system. Each subsequent stripe of data may be mapped to another set/subset of 5 drives within the set of drives of the CRUSH system.

Figure 2:
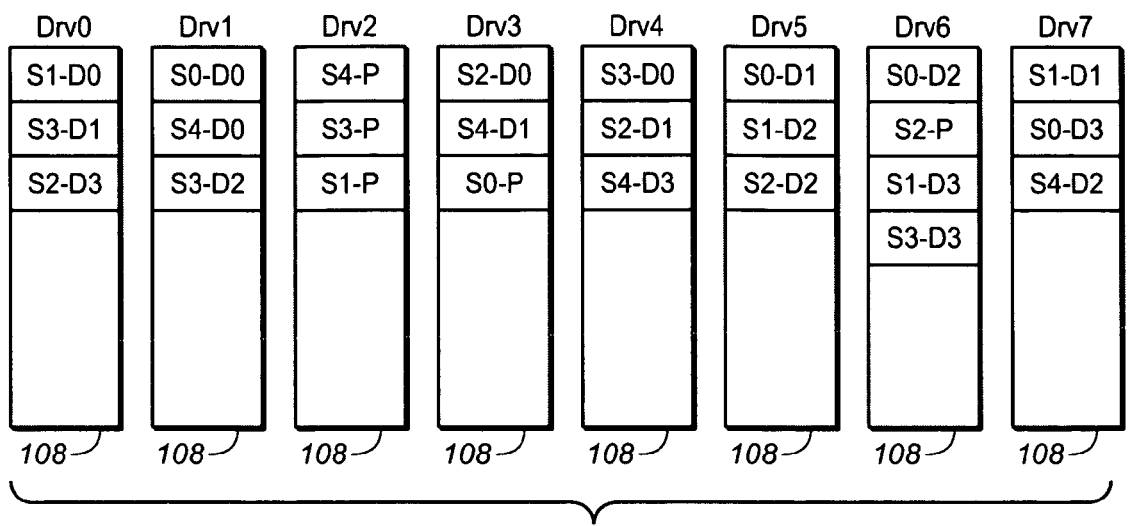
FIG. 2 is a block diagram schematic illustrating a data layout for disk drives of an exemplary embodiment of the disk-based archival storage system shown in FIG. 1, wherein said archival storage system is implementing Controlled Replication Under Scalable Hashing (CRUSH) in accordance with an exemplary embodiment of the present invention.

In exemplary embodiments, the archival storage system 100 of the present invention may implement CRUSH as a mechanism for mapping data and/or data stripes to storage objects (ex.—disks/drives/disk drives). FIG. 2 is a block diagram schematic of a data layout for disk drives 108 of an exemplary embodiment of the archival storage system 100 of the present invention, wherein the archival storage system 100 is implementing CRUSH. In the illustrated embodiment, there are eight disk drives 108 (shown in FIG. 2 as Drv0, Drv1, Drv2, Drv3, Drv4, Drv5, Drv6 and Drv7). Further, the archival storage system 100 (ex.—the CRUSH system) may implement, as its redundancy mechanism, a Redundant Array of Inexpensive Disks (RAID) 5 4+1 stripe/a distributed RAID 5 4+1 volume with data distributed by CRUSH across the eight drives 108.

In current embodiments of the present invention, the archival storage system 100, as mentioned above, may implement CRUSH for mapping data across the plurality of disk drives 108/set of disk drives. In further embodiments, disk(s)/disk drive(s)/drive(s) included in the plurality/set of disk drives 108 which contain(s)/store(s) an active stripe of data (ex.—a portion of an active stripe of data) may be configured in a first operating mode/operating state (ex.—a normal operating mode), while most or all of the remaining disk(s)/disk drive(s) included in the plurality of disks/disk drives 108 may be established in a second operating mode/operating state (ex.—a low power state), the second operating mode being a lower power state than the first operating mode. For example, in FIG. 2, the active stripe (S1) may be striped across 5 of the disk drives included in the plurality of disk drives 108. For instance, a first data segment (S1-D0) of the active stripe may be stored on a first drive (Drv0) of the system 100, a second data segment (S1-D1) of the active stripe may be stored on a second drive (Drv7) of the system 100, a third data segment (S1-D2) of the active stripe may be stored on a third drive (Drv5) of the system 100, a fourth data segment (S1-D3) of the active stripe may be stored on a fourth drive (Drv6) of the system 100, and a fifth data segment/a parity data segment (S1-P) may be stored on a fifth drive (Drv2) of the system 100. As mentioned above, the drives (Drv0, Drv2, Drv5, Drv6 and Drv7) which store/contain the portions/segments of data of the active stripe (S1) may be established in a first operating mode/operating state (ex.—a normal operating mode/normal power state/normal power mode) and the data/data portions/data segments on these normal power state drives of the system 100 may be immediately accessible (ex.—to be read). Further, as mentioned above, the drives (Drv1, Drv3, Drv4) which do not contain/store data segments of the active stripe (ex.—the remaining drives of the system 100) may be in a second operating mode/operating state which is a lower power operating mode than the first operating mode (ex.—a low power mode). In alternative embodiments, for an archival/archival storage system implementing CRUSH and RAID 5 4+1 stripe which includes a larger number of drives (ex.—one hundred drives), five of the one hundred drives may be established in a normal power mode, while the remaining ninety-five drives may be established in a lower power mode/low power mode/low power state.

In exemplary embodiments, any data written to the system 100 is written to the active stripe (ex.—S1). Further, mapping tables, if stored on the drives 108 may also be written to S1. In further embodiments, the system 100 may be configured so that before a stripe (ex.—the active stripe/$1^{st}$ active data stripe) is fully used/filled, the system 100 may select (ex.—via implementation/use of CRUSH) a next active stripe/next active data stripe/second active data stripe. Further, the system 100 may then establish drives which contain data/data segments of the next/subsequent/second active data stripe into a normal operating state/normal power mode. For example, in the embodiment illustrated in FIG. 2, the system 100 may select the next active data stripe (S2). Data Segments (S2-D0, S2-D1, S2-D2, S2-D3, S2-P) for the next active data stripe (S2) may be stored on respective drives (Drv3, Drv4, Drv5, Drv0, Drv6) of the system 100 which may be established in normal power mode, such that drives of the first active data stripe and the drives of the second active data stripe may concurrently be operating in normal power mode. This may promote prevention of delays in the ability of the system 100 to write data to the drives 108 when the first active data stripe becomes full. Still further, there may be some overlap between drives which store the first active data stripe and drives which store the second active data stripe, such that a drive(s) of the first active data stripe may also store data of the second/next active data stripe. In such instances, the drives which store both first active stripe data and next/second active stripe data will not need to be placed into normal power mode when the next active stripe is selected, as they will already be operating in normal power mode (since they are also first active stripe drives).

In further embodiments, mapping tables may be placed in the next active data stripe (S2). As shown in FIG. 2, three of the drives (Drv0, Drv5, Drv6) which store data/data segments of the next active stripe (S2) also store data of the active stripe (S1). Thus, when the system 100 selects the next active stripe, these drives (Drv0, Drv5, Drv6) will already be in normal power mode and will not have to be placed/switched into normal power mode at that time. However, when the system 100 selects the next active stripe, drives (Drv3 and Drv4) of the system 100 which store data of the next active stripe (S2), but not the active stripe (S1) will be established/placed into normal power mode from low power mode. Further, when the system 100 selects the next active stripe and/or when the active stripe is full, the drives (Drv2 and Drv7) containing data of the active stripe (S1) but not data of the next active stripe (S2) may be moved from the normal power mode down to the low power mode/low power state. Thus, in embodiments where the archival storage system 100 includes one hundred disks, a maximum of ten drives containing two active stripes may be in normal power mode at any given time.

In further embodiments, the system 100 may implement an algorithm to select a next active stripe, such that the next active stripe has a high degree of overlap with the active stripe/the current active stripe, thereby providing a scenario in which the number of drives 108 of the system 100 having to operate concurrently in a normal power state is minimized/reduced. In additional embodiments, stripe depth(s) for the system 100 may be selected to be large in order to minimize the amount of time during which multiple stripes will need to be active.

In exemplary embodiments, when requested data is to be read from the system 100, the location of the requested data must first be determined. If the requested data is located/stored on a drive that is not currently in the active stripe (ex.—is located on a drive that does not store data segments of the active stripe/a non-active stripe drive), then the drive/drives 108 upon which the requested data is located must be moved to a normal power state in order for the requested data to be read from said drive/drives 108 and returned to a host. Further, it may be that data which is read once, may likely be read again. Thus, it may be beneficial to always keep a frequently-read data portion on a drive which is active/part of the active stripe. In current embodiments of the present invention, this may be achieved by reserving an area on the active drive/active set of drives for use as a cache for read data. For example, when a read of a frequently read data portion is requested, and the frequently read data portion is located on a drive that is not currently in the active stripe at the time of the read request, in the system 100 of the present invention, a copy of the frequently read data portion may already be stored in a cache of the active set of drives/active stripe drives, thereby allowing the frequently read data portion/the copy of the frequently read data portion to be read from the active stripe drives. This cache feature of the present invention promotes faster/easier accessibility to data requested via read requests, and promotes system efficiency by allowing the system 100 to grant the read request without having to switch the non-active stripe drives from low power mode to higher/normal power mode.

The system 100 of the present invention promotes ease and flexibility of incremental growth of the number of disk drives in the system 100. For example, the system 100 of the present invention may implement MAID techniques (such as disclosed in *The Case for Massive Arrays of Idle Disks (MAID)*, Colarelli et al., Dept. of Computer Science, Univ. of Colorado, Boulder, pp. 1-6, Jan. 7, 2002, which is herein incorporated by reference in its entirety) for managing the drives 108, and, as mentioned above, the system 100 may also implement CRUSH. With CRUSH, any number of new drives may be added to the system 100 and the data stored by the system 100 is remapped across all (existing and the newly added) drives of the system 100. In exemplary embodiments of the system 100 of the present invention, this remapping process may involve moving the percentage of data added. For instance, if three drives are added to a one hundred drive system, then three percent of the data stored by the system 100 would need to be moved. Further, the storage system 100 of the present invention allows for growth of the system 100 in increments as small as a single drive. Thus, if the system 100 of the present invention implements a distributed RAID 5 4+1 volume/has 4+1 RAID 5 groups, drives do not need to be added in groups of 5 when increasing the number of drives.

The system 100 of the present invention also provides full-time redundancy and does not require implementation of hot spares. For example, because the system 100 of the present invention implements CRUSH/is a CRUSH system 100, data stored by the system 100 may be spread across all drives 108 of the system 100. Further, redundancy may be provided by keeping some space available on all drives 108 of the system 100 to provide a storage location for data recreated after a drive failure.

The system 100 of the present invention promotes quicker redundancy recovery after the occurrence of a drive failure. In further embodiments, the system 100 of the present invention may allow for the order of data recovery to be modified so that current read requests may be serviced. In additional embodiments, the system 100 further promotes more flexible scheduling of drive replacement. For example, when a drive failure occurs, redundant data may be used to recreate data from the failed drive and the data is spread across remaining drives. In the system 100 of the present invention, since said system 100 is a CRUSH system/CRUSH-based system, as mentioned above, system data is spread across all drives 108. Further, a set/subset of the drives 108 containing a set of stripes of data may be set to a normal power state and data may be recreated across a set/subset of the drives 108 larger than a single stripe. In still further embodiments, the system 100 may be configured for rotating drives 108 into and out of the normal power state/normal power mode so that data reconstruct time and maximum power usage are balanced. Still further, as the system 100 is serving read requests, the order of stripe reconstruction may be modified so that the drives which were returned to normal power state may be used to service the read request and may also participate in stripe reconstruction.

Figure 3:
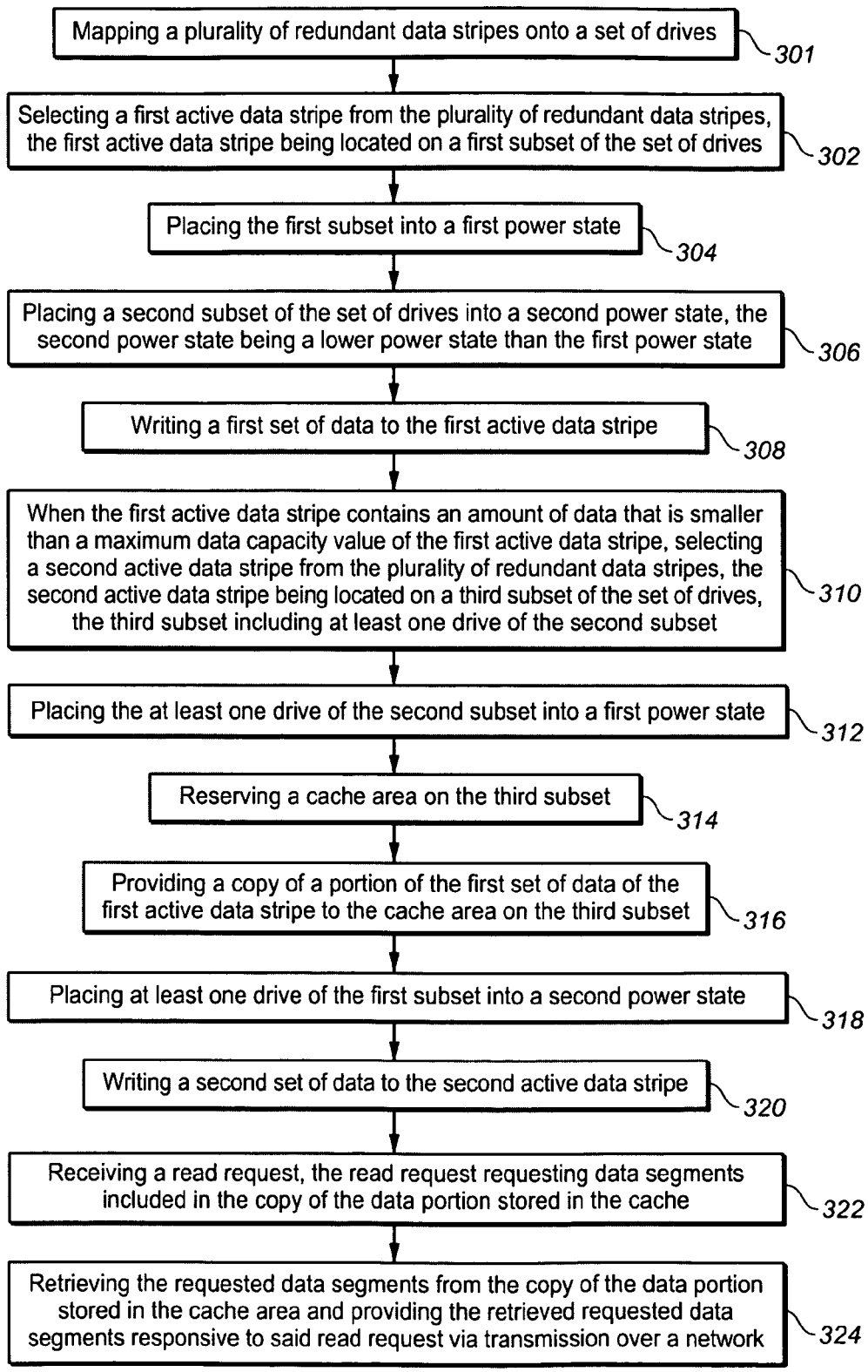
FIG. 3 is a flow chart illustrating a method for data management in a disk-based archival storage system in accordance with a further exemplary embodiment of the present invention.

In FIG. 3, a method for drive management and data placement in an archival storage system (such as the system 100 shown in FIGS. 1 and 2) which includes a set of drives 108 (ex.—Drv0, Drv1, Drv2, Drv3, Drv4, Drv5, Drv6, Drv7) in accordance with an exemplary embodiment of the present invention is shown. In current embodiments of the present invention, the method 300 may include mapping a plurality of redundant data stripes across/onto the set of drives 301. For example, the stripes may be mapped via CRUSH. The method 300 may further include the step of selecting an active data stripe/first active data stripe from the plurality of redundant data stripes, the active data stripe/first active data stripe being located on a first subset of the set of drives 302. For example, the active data stripe/first active data stripe may be S1 (as shown in FIG. 2 and discussed above) and may be located on the first subset (ex.—Drv0, Drv2, Drv5, Drv6 and Drv7) of the set of drives 108. The method 300 may further include placing the first subset/first drive subset (ex.—each of the drives of the first subset) into a first (ex.—a normal) power state 304. The method 300 may further include placing a second subset (ex.—Drv1, Drv3 and Drv4) of the set of drives 108 into a second power state (ex.—a low power state), the second power state being a lower power state than the first power state 306. The method 300 may further include writing data (ex.—a first set of data) to the active data stripe (S1) on the first subset 308.

When the active data stripe/first active data stripe (S1) includes/contains an amount of data/write data that is smaller than a maximum data capacity value of the first active data stripe (ex.—before the active data stripe/first data stripe (S1) is full/completely filled with write data/fully used), the method 300 may further include selecting a next active data stripe/second active data stripe (ex.—via implementation of Controlled Replication Under Scalable Hashing (CRUSH)) from the plurality of redundant data stripes, the second active data stripe being located on a third subset of the set of drives, the third subset including at least one drive of the second subset 310. For example, the next active/second active data stripe may be S2 (as shown in FIG. 2 and discussed above) and may be located on the following drives: Drv0, Drv3, Drv4, Drv5 and Drv6, which are drives of the third subset. The method 300 may further include placing the at least one drive of the second subset into the first (ex.—normal) power state 312. In the example above, this step involves placing the drives of the third subset which are not included in the first subset (ex.—drives denoted as Drv3 and Drv4) into normal power state. Drives of the third subset which were also included in the first subset (ex.—drives denoted as Drv0, Drv5, and Drv6) will already be in normal power state and will not need to be switched/placed into normal power state at this point. The method 300 may further include reserving a cache area on the third subset 314. For the example given above, this step may involve reserving a cache area on one or more of the following drives: Drv0, Drv3, Drv4, Drv5, and/or Drv6. The method 300 may further include providing a copy of a portion of the first set of data of the first active data stripe to the cache area on the third subset 316. For example, the portion of the first set of data may be stored on a drive which was included in the first subset, but not included in the third subset (such as the drives denoted as Drv2 or Drv7. In alternative embodiments, data from a drive(s) which is/are part of the second subset, but is/are not included in the third subset (such as the drive denoted as Drv1) may be copied to the cache area.

The method 300 may further include placing at least one drive of the first subset into the second power state 318. For instance, when an amount of data stored on the first active data stripe (S1) is equal to the maximum data capacity value of the first active data stripe (S1) (ex.—when the first active data stripe is completely filled with write data), at least one drive of the first subset, which is not included in the third subset may be placed into the second power state. For the example given above, this step may involve placing the drives denoted as Drv2 and/or Drv7 into low power mode. Further, the method 300 may include writing data (ex.—a second set of data) to the second active data stripe 320. For instance, when the drives of the third subset are in the first power state and the at least one drive of the first subset (ex.—Drv2 and/or Drv7) is in the second power state, the method 300 may further include writing data to the second active data stripe 320. The method 300 may further include receiving a read request, the read request requesting data segments included in the copy of the data portion stored in the cache area 322. The method 300 may further include retrieving the requested data segments and providing the retrieved requested data segments responsive to said read request via transmission over a network 324.

In exemplary embodiments, the selected next/second active data stripe may be selected via implementation of an algorithm. In further embodiments, the selected second active data stripe may be selected based upon a degree of overlap between the second active data stripe and the first active data stripe for promoting increased power efficiency of the system.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for drive management and data placement in an archival storage system which includes a set of drives, said method comprising:
   mapping a plurality of redundant data stripes onto the set of drives;
   selecting a first active data stripe from the plurality of redundant data stripes, the first active data stripe being located on a first subset of the set of drives;
   placing the first subset into a first power state;
   placing a second subset of the set of drives into a second power state, the second power state being a lower power state than the first power state; and
   writing a first set of data to the first active data stripe, when the first active data stripe contains an amount of data that is smaller than a maximum data capacity value of the first active data stripe, selecting a second active data stripe from the plurality of redundant data stripes, the second active data stripe being located on a third subset of the set of drives, the third subset including at least one drive of the second subset, wherein the selected second active data stripe is selected via implementation of an algorithm, and is selected based upon degree of overlap between the second active data stripe and the first active data stripe for promoting increased power efficiency of the archival storage system.

2. A method as claimed in claim 1, further comprising:
placing the at least one drive of the second subset into the first power state.

3. A method as claimed in claim 2, further comprising:
reserving a cache area on the third subset.

4. A method as claimed in claim 3, further comprising:
providing a copy of a portion of the first set of data of the first active data stripe to the cache area on the third subset.

5. A method as claimed in claim 4, further comprising:
placing at least one drive of the first subset into the second power state.

6. A method as claimed in claim 5, further comprising:
writing a second set of data to the second active data stripe.

7. A method as claimed in claim 6, further comprising:
receiving a read request, the read request requesting data segments included in the copy of the data portion stored in the cache.

8. A method as claimed in claim 7, further comprising:
retrieving the requested data segments from the copy of the data portion stored in the cache area and providing the retrieved requested data segments responsive to said read request via transmission over a network.

9. A method as claimed in claim 1, wherein the selected second active data stripe is selected via implementation of Controlled Replication Under Scalable Hashing.

10. An archival storage system, comprising:
a set of disk drives;
means for mapping a plurality of redundant data stripes onto the set of drives;
    means for selecting a first active data stripe from the plurality of redundant data stripes, the first active data stripe being located on a first subset of the set of drives;
    means for placing the first subset into a first power state;
    means for placing a second subset of the set of drives into a second power state, the second power state being a lower power state than the first power state;
    means for writing data to the first active data stripe on the first subset; and
    when at least a portion of the data has been written to the first active data stripe and the portion of the data is smaller than a maximum data capacity value of the first active data stripe, implementing Controlled Replication Under Scalable Hashing to select a second active data stripe from the plurality of redundant data stripes, the second active data stripe being located on a third subset of the set of drives, the third subset including at least one drive of the second subset, wherein the system implements Massive Array of Independent Disks techniques for drive management and implements Controlled Replication Under Scalable Hashing for data placement.

* * * * *